Oct. 6, 1931.  W. OWEN  1,825,887
GLASS TANK CONSTRUCTION
Filed May 21, 1929  3 Sheets-Sheet 1

INVENTOR
Wm Owen
by
James E Bradley
atty

Oct. 6, 1931.                W. OWEN                  1,825,887
                      GLASS TANK CONSTRUCTION
               Filed May 21, 1929          3 Sheets-Sheet 2
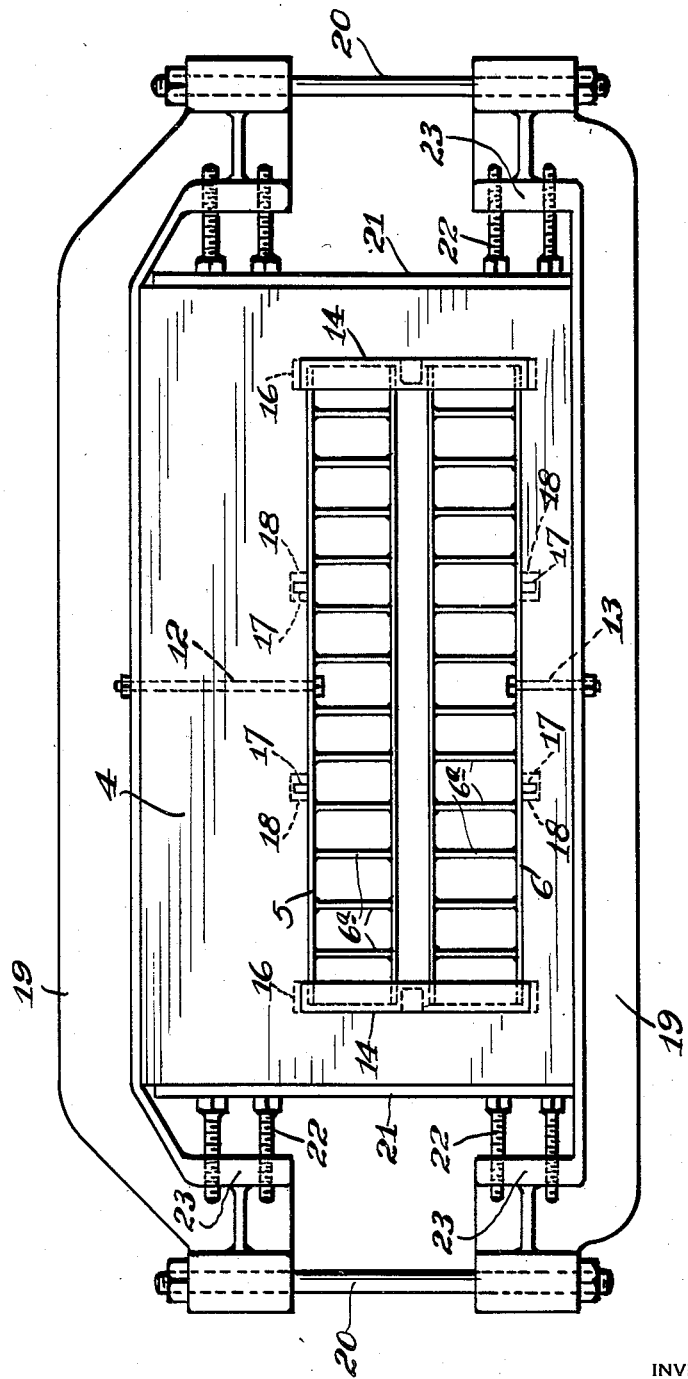
INVENTOR
Wm Owen
by James C Bradley
att Oct. 6, 1931.  W. OWEN  1,825,887
GLASS TANK CONSTRUCTION
Filed May 21, 1929  3 Sheets-Sheet 3
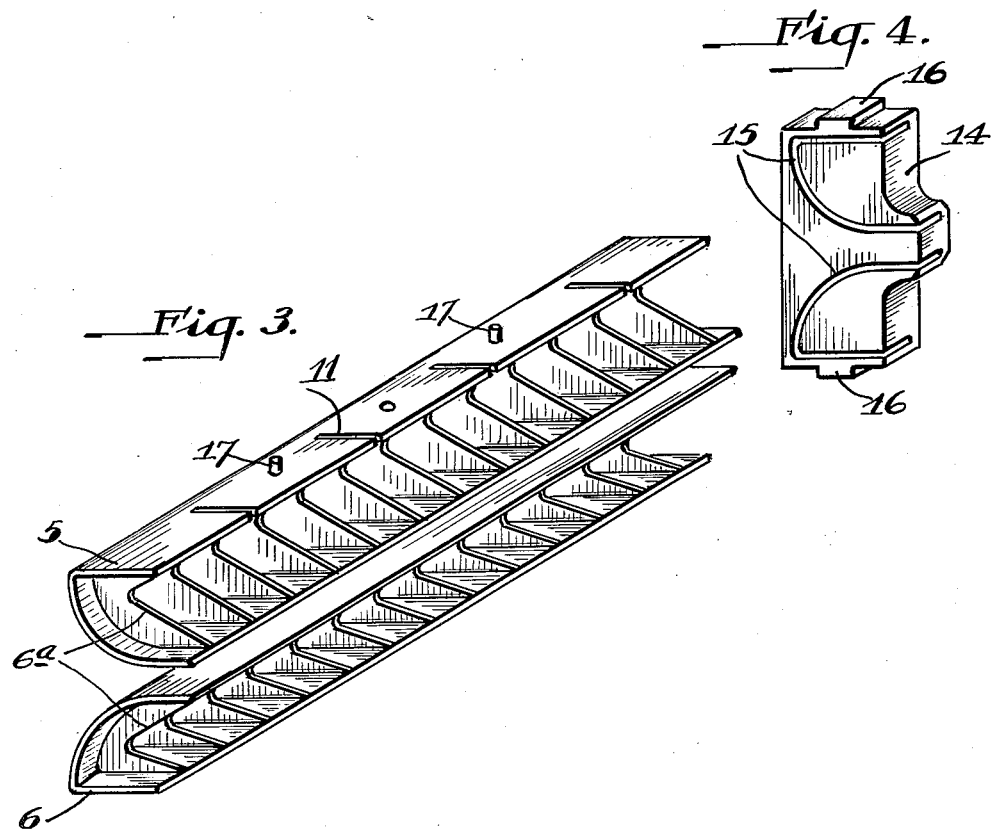
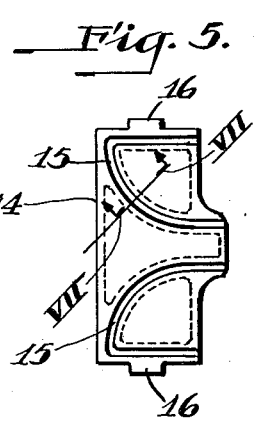
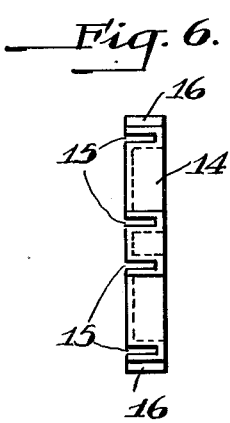
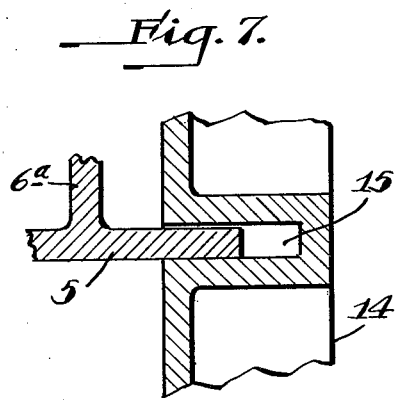
INVENTOR
Wm Owen
by James C Bradley
Atty Patented Oct. 6, 1931

1,825,887

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

GLASS TANK CONSTRUCTION

Application filed May 21, 1929. Serial No. 364,862.

Figure 1:
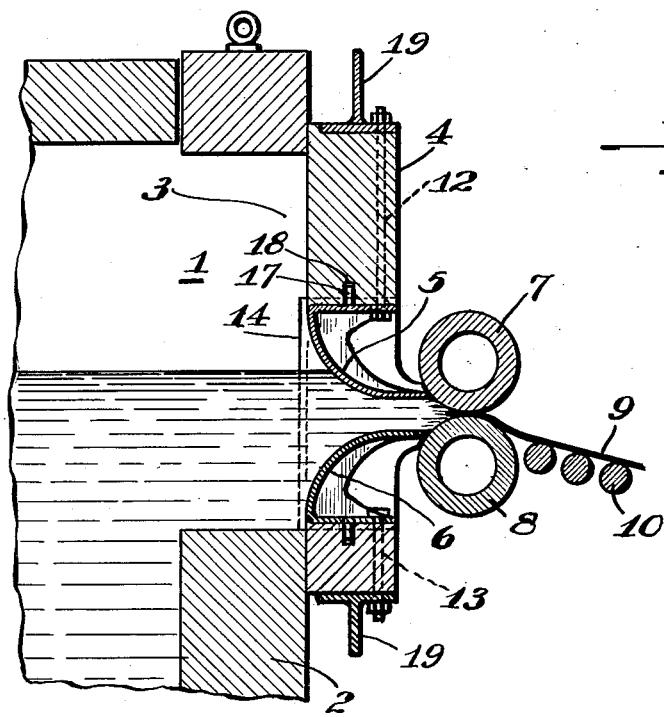
Figure 8:
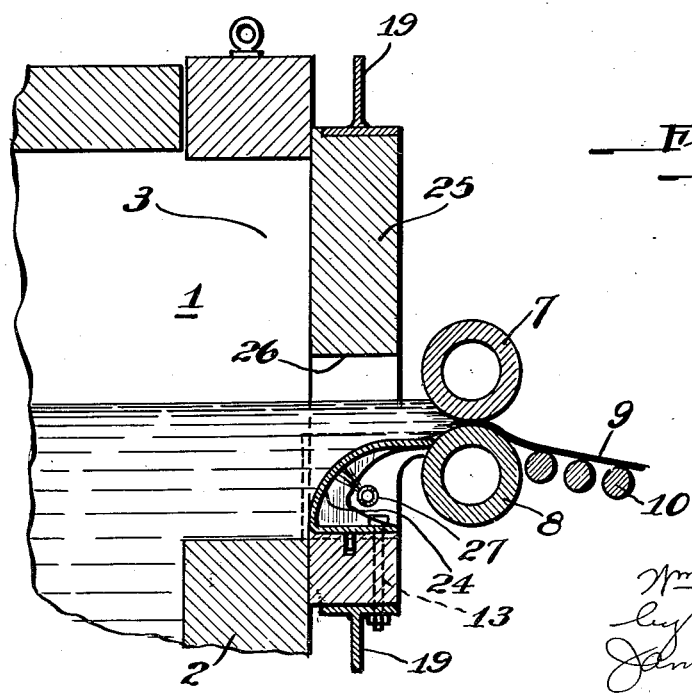

The invention relates to a glass tank or furnace construction, and particularly to the wall of the tank through which glass is continuously withdrawn in the form of a sheet or ribbon. Heretofore it has been the practice to provide an end wall of clay with a slot therethrough for directing the molten glass between the forming rolls located in opposition to the slot. Glass produced in this manner shows a considerable amount of blister particularly on the lower side of the sheet. This appears to be due to the fact that the clay lips of the slot decompose and give off bubbles of gas which are incorporated into the surface of the glass and are held there due to the hardening of the glass. Both sides of the sheet are subject to this action, but the bubbles in the top surface have a better chance to escape or remain at the surface of the glass than the bubbles in the lower side of the sheet which tend to move upward and thus penetrate deeper into the sheet. The object of the present invention is to substitute for the clay lips, and particularly for the lower lip, a lip construction of metal which will not give off bubbles; which is so supported that it will not warp under the severe heat conditions which are encountered, and which will not cause the glass to devitrify, as has heretofore been the case where metal members protected by water cooling have been used in contact with molten glass. Certain embodiments of the invention are illustrated in the accompanying drawings, wherein:

Figure 1 is a vertical section through the end of a glass tank embodying the invention. Fig. 2 is a front elevation of a part of the construction of Fig. 1. Fig. 3 is an isometric view of the metal outlet lips employed. Fig. 4 is a similar view of one of the end pieces or holders for receiving the ends of the metal lips. Figs. 5 and 6 are front and edge elevations of one of the end pieces or holders. Fig. 7 is an enlarged scale on the line VII—VII of Fig. 5. And Fig. 8 is a vertical section similar to that of Fig. 1 through a modification.

Referring to the drawings, 1 is the outlet end of a glass melting tank having the end wall 2 and an opening 3 closed by the member 4. This member 4 is provided with a pair of opposing metal outlet lips 5 and 6 through which the molten glass from the tank discharges to the pass between the water cooled driven forming and sizing rolls 7 and 8. The glass sheet or ribbon 9 formed between the rolls passes over the apron rolls 10 and into an annealing leer of the roller type which is not shown.

The lips 5 and 6 are preferably formed of heat resisting metal, such as a chromium iron alloy adapted to withstand the corroding effect of the glass at a temperature of 2100 deg. F. or slightly above this point. These lips are of the cross section shown in Fig. 1 and as shown are stiffened with the ribs 6a although this is not essential if the metal formed body of the lips is made somewhat thicker in order to compensate for the loss of strength. In order to reduce the tendency to warp, the lips may be slotted at intervals along their horizontal flanges, as indicated at 11 in Fig. 3. Each lip is anchored to the clay member 4 by means of a bolt at its central portion (bolts 12 and 13, Fig. 2). In order to support the ends of the lips 5 and 6, end members 14, 14 are provided having slots 15, 15 therein into which the ends of the lips fit. The slots 15, 15 are of sufficient depth to permit the ends of the lips to move in and out as such lips contract and expand under changing heat conditions (Fig. 7). This freedom of movement endwise of the lips reduces the tendency to warp. The members 14, 14 are anchored in clay by means of the lugs 16, 16. Each of the lips is also provided with a pair of pins 17, 17 fitting in suitable slots 18, 18 in the clay and permitting endwise movement of the lips, but holding them against movement in a direction at right angles to their length.

The clay member 4 is clamped between the pair of castings 19, 19 by means of the bolts 20, 20, as indicated in Fig. 2. The ends of the clay member are supported by the vertical plates 21, 21 engaged by the ends of the bolts 22, 22, etc. threaded through the flanges 23, 23, etc. forming part of the castings 19, 19. The member 4 with its clamping frame, as above described is held tightly against the end wall 2 and supported by any suitable means, not shown.

Fig. 8 illustrates a modification in which only a single metal lip 24 is employed in the clay member 25, the upper edge 26 of the slot through such member 25 being spaced above the level of the glass in the tank. In other respects, the construction follows that heretofore described. In case the cooling effect of the lip 24 upon the glass is too great, this may be reduced by the provision of a burner pipe 27 perforated on the side next to the lip and supplied with a suitable mixture of air and gas. The lip 24 is constructed similar to the lips 5 and 6 of Fig. 1 and is similarly supported in suitable end members corresponding to the members 14, 14 which permits of the endwise expansion of the lip.

What I claim is:

1. The combination with a tank adapted to carry a bath of molten glass, and rolling means at one side thereof for forming a sheet or ribbon of glass, of a clay outlet member between the glass bath and the rolling means provided with a slot extending longitudinally thereof, slotted metal holding members fixed in the outlet member at the ends of the slot, and a lip member of metal mounted in the slot with its ends in interlocking engagement with the slots in the end members, such lip member being positioned to direct the glass from the tank to the pass between the rolls.

2. The combination with a tank adapted to carry a bath of molten glass, and rolling means at one side thereof for forming a sheet or ribbon of glass, of a clay outlet member between the glass bath and the rolling means provided with a slot extending longitudinally thereof, slotted metal holding members fixed in the outlet member at the ends of the slot, and a lip member of metal mounted in the slot with its ends in interlocking sliding engagement with the slots in the end members to permit free expansion of the lip member, such lip member being positioned to direct the glass from the tank to the pass between the rolls.

3. The combination with a tank adapted to carry a bath of molten glass, and rolling means at one side thereof for forming a sheet or ribbon of glass, of a clay outlet member between the glass bath and the rolling means provided with a slot extending longitudinally thereof, and a lip member of metal mounted in the slot in position to direct the glass from the tank to the pass between the rolls, said lip member being in the form of a shell open on its outer side, said lip member comprising a flat horizontal flange engaging one edge of the slot and a concave convex flange extending forwardly from the inner edge of said flat flange with its convex face engaging the glass in the tank.

4. The combination with a tank adapted to carry a bath of molten glass, and rolling means at one side thereof for forming a sheet or ribbon of glass, of an upright clay outlet member between the glass bath and the rolling means provided with a horizontal slot extending longitudinally thereof, and a lip member of metal lying within the slot and comprising a flange seated on the lower wall of the slot and a convex shell extending upwardly and forwardly from the rear edge of said flange to the rolling means with the space between the flange and shell open to the atmosphere.

5. The combination with a tank adapted to carry a bath of molten glass, and rolling means at one side thereof for forming a sheet or ribbon of glass, of an upright clay outlet member between the glass bath and the rolling means provided with a horizontal slot extending longitudinally thereof, and a lip member of metal lying within the slot and comprising a flange seated on the lower wall of the slot, a convex shell extending upwardly and forwardly from the rear edge of said flange to the rolling means with the space between the flange and shell open to the atmosphere, and a series of stiffening ribs between the flange and shell.

6. The combination with a tank adapted to carry a bath of molten glass, and rolling means at one side thereof for forming a sheet or ribbon of glass, of an upright clay outlet member between the glass bath and the rolling means provided with a horizontal slot extending longitudinally thereof, and a lip member of metal lying within the slot and comprising a flange seated on and secured to the lower wall of the slot, and a convex shell extending upwardly and forwardly from the rear edge of said flange to the rolling means with the space between the flange and shell open to the atmosphere.

7. The combination with a tank adapted to carry a bath of molten glass, and rolling means at one side thereof for forming a sheet or ribbon of glass, of an upright clay outlet member between the glass bath and the rolling means provided with a horizontal slot extending longitudinally thereof, and a pair of lip members of metal lying within the slot and each comprising a horizontal flange secured to one of the walls of the slot, and a convex shell extending forwardly from the rear edge of the flange to the rolling means with the space between the flange and shell open to the atmosphere.

In testimony whereof, I have hereunto subscribed my name this 15th day of May, 1929.

WILLIAM OWEN.